United States Patent
Martinez et al.

(10) Patent No.: US 8,203,598 B2
(45) Date of Patent: Jun. 19, 2012

(54) METHOD AND APPARATUS FOR CAPTURING THREE-DIMENSIONAL STEREOSCOPIC IMAGES

(75) Inventors: Juan Martinez, Hewitt, NJ (US); Andrew Berger, Pearl River, NY (US)

(73) Assignees: Sony Corporation, Manato-Ku, Tokyo (JP); Sony Electronics Inc., Parkridge, NJ (US)

( * ) Notice: Subject to any disclaimer, the term of this patent is extended or adjusted under 35 U.S.C. 154(b) by 423 days.

(21) Appl. No.: 12/480,668

(22) Filed: Jun. 8, 2009

(65) Prior Publication Data
US 2010/0309291 A1    Dec. 9, 2010

(51) Int. Cl.
*H04N 13/02* (2006.01)
*G03B 21/00* (2006.01)

(52) U.S. Cl. .................. 348/47; 348/49; 353/7
(58) Field of Classification Search .......... None
See application file for complete search history.

(56) References Cited

U.S. PATENT DOCUMENTS

| | | | |
|---|---|---|---|
| 4,751,570 A * | 6/1988 | Robinson | 348/47 |
| 6,603,504 B1 | 8/2003 | Son et al. | |
| 7,061,532 B2 | 6/2006 | Silverstein | |
| 7,204,592 B2 * | 4/2007 | O'Donnell et al. | 353/7 |
| 7,609,327 B2 * | 10/2009 | Matusik | 348/591 |
| 2004/0001145 A1 * | 1/2004 | Abbate | 348/207.99 |

FOREIGN PATENT DOCUMENTS

| | | |
|---|---|---|
| EP | 2000843 A2 | 12/2008 |
| WO | 2004/010203 A1 | 1/2001 |

* cited by examiner

*Primary Examiner* — Wen-Tai Lin
(74) *Attorney, Agent, or Firm* — Moser Taboada

(57) ABSTRACT

A method for capturing a three-dimensional image. The method comprises capturing a combined beam of light having first polarized beam of light and a second polarized beam of light, sampling the combined beam of light using an imager, and providing the first polarized image to a first output and the second polarized image to a second output. The first polarized beam of light and the second polarized beam of light are orthogonally polarized. The imager includes a set of first polarized pixels for sampling the first polarized beam of light to produce a first polarized image, and a set of second polarized pixels for sampling the second polarized beam of light to produce a second polarized image.

12 Claims, 5 Drawing Sheets

METHOD AND APPARATUS FOR CAPTURING THREE-DIMENSIONAL STEREOSCOPIC IMAGES

BACKGROUND

1. Field of the Invention

Embodiments of the present invention generally relate to three-dimensional (3D) imaging techniques and, more particularly, to a method and apparatus for capturing three-dimensional stereoscopic images.

2. Description of the Related Art

With the increased popularity of digital cameras in the consumer marketplace, great advancements have resulted in digital imaging and video processing. These cameras capture still images as well as moving, or video, images.

The term "stereo imaging" involves capturing of two images of a scene to simulate the process by which the brain perceives 3D objects. To perceive the depth dimension of an image, the brain relies on the horizontal displacement of images provided by both eyes to create parallax (the apparent displacement of an object when viewed along two different lines of sight). The brain is able to merge the two images to perceive this parallax as the dimension of depth. This allows a person to see an object as solid in three spatial dimensions, such as width, height, and depth (i.e., x, y and z).

Conventionally, there exist various techniques for capturing high-definition stereo 3D images. However, such techniques primarily utilize two separate cameras and lenses for capturing a scene using two exposures, the exposures being made from two different viewpoints. Such cameras must be identical to each other in terms of type and settings, which is difficult and time consuming to achieve. The use of two cameras decreases reliability and usability while increasing the cost and weight of the imaging assembly.

Therefore, there is a need in the art for a method and apparatus for capturing 3D stereoscopic images.

SUMMARY OF THE INVENTION

Embodiments of the present disclosure generally include a method and apparatus for capturing a 3D image. In one embodiment, the method for capturing the 3D image is provided. The method comprises capturing a combined beam of light having a first polarized beam of light and a second polarized beam of light, sampling the combined beam of light using an imager, and providing the first polarized image to a first output and the second polarized image to a second output. The first polarized beam of light and the second polarized beam of light are orthogonally polarized. The imager includes a set of first polarized pixels for sampling the first polarized beam of light to produce a first polarized image, and a set of second polarized pixels for sampling the second polarized beam of light to produce a second polarized image.

In yet another embodiment, an apparatus for capturing a 3D image is provided. The apparatus includes an imager for separating a first polarized beam of light and a second polarized beam of light from a combined beam of light, wherein the imager is comprised of one or more first polarized pixels for capturing a first polarized image and one or more second polarized pixels for capturing a second polarized image, and providing the separated first polarized image to a first output and the separated second polarized image to a second output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained further below, various embodiments of the invention enable capturing a 3D image. The method includes sampling a combined beam of light that includes vertically polarized light and horizontally polarized light. The method further separates the vertically polarized light and the horizontally polarized light from the combined beam of light using an imager. The imager includes one or more vertically polarized pixels for capturing a vertically polarized image and one or more horizontally polarized pixels for capturing a horizontally polarized image. The method provides the vertically polarized image to a first output and the horizontally polarized image to a second output.

Further various embodiments of the instant invention disclose an apparatus for capturing a 3D image. The apparatus primarily includes an optical module, an imager and an output module for capturing the 3D image. The optical module generates a combined beam of light having vertically polarized light and horizontally polarized light. The imager captures a vertically polarized image and a horizontally polarized image from the beam of light, wherein the imager is comprised of one or more vertically polarized pixels for capturing the vertically polarized image and one or more horizontally polarized pixels for capturing the horizontally polarized image, and further provides the vertically polarized image to a first output and the horizontally polarized image to a second output. The output module for processing and encoding the separated vertically polarized image and the separated horizontally polarized image is used to produce the 3D image.

Figure 1:
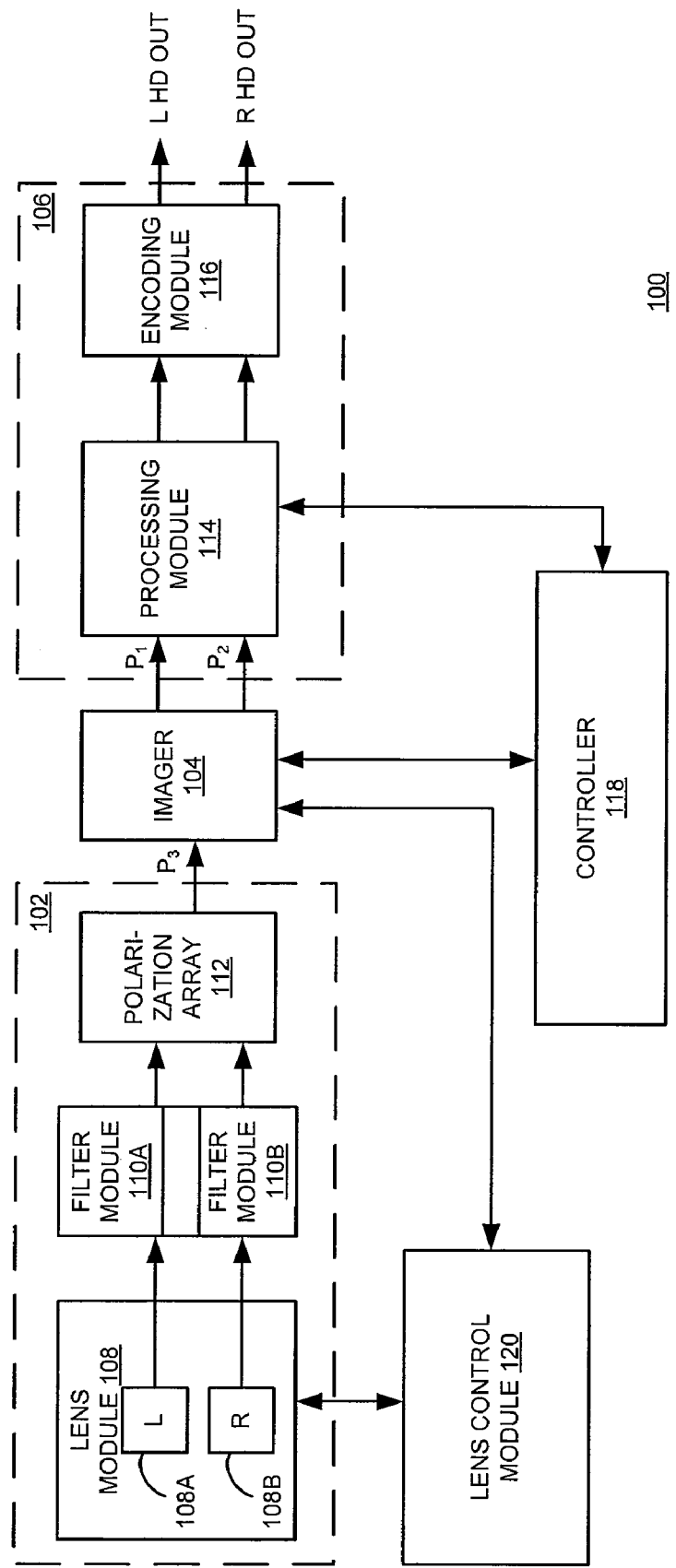
FIG. 1 is a block diagram of an apparatus for capturing a 3D image, according to one or more embodiments of the present invention.

FIG. 1 is a block diagram of an apparatus 100 for capturing a 3D image, according to one or more embodiments of the present invention. The apparatus 100 includes an optical module 102, an imager 104 and an output module 106.

The optical module 102 primarily generates a beam of light that includes a vertically polarized image and a horizontally polarized image. In one embodiment, the optical module 102 includes a lens module 108, one or more filter modules 110A and 110B, and a polarization array 112. The lens module 108 includes a left lens 108A and a right lens 108B for capturing light or images for a left eye and a right eye, respectively. The light is captured from two different viewpoints that are horizontally displaced from each other. In some embodiments, the horizontal displacement between the two viewpoints is approximately 65 mm, an average distance between a person's eyes.

The filter modules 110A and 110B convert the light received from the lens module 108 into a vertically polarized beam of light and a horizontally polarized beam of light. For the purpose of simplicity, the left beam is referred to as a vertical polarized beam and the right beam is referred to as a horizontally polarized beam, but one of ordinary skill in the art would recognize that any two polarizing filters offset by 90 degrees would suffice. Linear polarization techniques for converting the light into horizontal and vertical polarization are discussed by way of example and are not intended to limit the invention to such. Although vertically polarized light is generally discussed with reference to a left image and horizontally polarized light is generally discussed with reference to a right image, either polarization would suffice for either image. One of ordinary skill would recognize that other polarization techniques, such as circular polarization using prisms (resulting in left and right polarized light), would result in equally valid embodiments of the present invention. Those skilled in the art will appreciate that various other polarization devices similar to the filter modules 110A and 110B may be configured for utilizing various polarization techniques.

The polarization array 112 mixes and/or combines the vertically polarized light and the horizontally polarized light received from the filter modules 110A and 110B to produce a combined beam of light. Although the two images are combined into a single beam of light, no compression or loss of resolution occurs due to the combined beam being the result of two orthogonally polarized beams of light. In some embodiments, the polarization array 112 may include one or more mirrors (not shown in FIG. 1) for mixing and/or combining the vertically polarized beam and the horizontally polarized beam to produce a single beam of light. In other embodiments, various lenses, prisms, and the like may be used to combine the beams into a single beam.

The imager 104 receives the combined beam of light (at P3) from the polarization array 112 and separates the beam of light into a vertically polarized image and a horizontally polarized image. The imager 104 includes one or more vertically polarized pixels for capturing the vertically polarized image and one or more horizontally polarized pixels for capturing the horizontally polarized image. In an embodiment, the imager 104 may include a filter for capturing the vertically polarized image by the one or more vertically polarized pixels and the horizontally polarized image by the one or more horizontally polarized pixels. In another embodiment, the vertically polarized pixels and the horizontally polarized pixels are distributed in equal half for each frame. The imager 104 may have two simultaneous Correlated Double Sampling (CDS) analog outputs, such as a first output P1 and a second output P2 according to an array of the vertically polarized pixels and the horizontally polarized pixels. In some embodiments, the imager 104 provides the vertically polarized image to the first output P1 and the horizontally polarized image to the second output P2. Thus, the vertically polarized image and the horizontally polarized image are generated using a single imager (i.e., the imager 104).

In an embodiment, the imager 104 is capable of separating colors and vertically (V) and horizontally (H) polarized light into two independent RGB outputs for obtaining 3D images.

The output module 106 includes a processing module 114, and an encoding module 116. The output module 106 is operatively coupled with the imager 104 for processing and encoding the separated vertically polarized image and the separated horizontally polarized image that are received from the imager 104 (through the first output P1, and the second output P2) to produce the 3D or stereoscopic images. The final output is in a form of a left high-definition (L HD) image and a right high-definition (R HD) image which may be broadcasted for multiple purposes.

The processing module 114 processes the vertically polarized image received from the first output P1 and the horizontally polarized image received from the second output P2. In an embodiment, the processing module 114 may include one or more dual channel Digital Signal Processing (DSP) controllers for processing the vertically polarized image and the horizontally polarized image received from the imager 104.

In alternate embodiments, the processing module 114 performs analog-to-digital conversion (A/D) on the vertically polarized image and the horizontally polarized image received from the imager 104. In an embodiment, the processing module 114 performs predetermined analog signal processing on analog image signal outputs (P1 and P2) from the imager 104. In some embodiments, during A/D conversion, each of analog R, G, and B image signals output from the imager 104 is converted into a digital image signal represented by a plurality of bits (e.g., 12 bits) on the basis of the timing pulse output from a timing control module (not shown).

In an embodiment, the processing module 114 may further include a CDS module (not shown in FIG. 1), an Auto Gain Control (AGS) module (not shown in FIG. 1), and a clamping module (not shown in FIG. 1).

In an embodiment, the CDS module may be utilized to detect only a desired signal component in a device, such as the imager 104 by removing, for example, fixed pattern noise (FPN) from a signal output from a unit pixel. For CDS, a difference between a reset signal and an image signal is determined. The reset signal is generated with a predetermined voltage level applied on the unit pixel. The image signal represents an intensity of light sensed by the unit pixel. Thus, CDS is effective in reducing FPN that is inherent in the unit pixels and also noise caused by characteristic differences between the unit pixels.

In some other embodiments, the processing module 114 may further include a black level correction module (not shown in FIG. 1), a white balance control module (not shown in FIG. 1), and a gamma correction module (not shown in FIG. 1) for applying a color correction, such as a black level correction, a white balance correction, and a gamma correction, respectively, on the vertically polarized image and the horizontally polarized image received from the imager 104. In an embodiment, the processing module 114 further performs predetermined signal processing on the image data output after the A/D conversion so as to generate an image file. Subsequently, each block of the processing module 114 performs processing thereof while accessing the image data stored in an image memory.

In an embodiment, the black level correction module corrects the black level of each of the R, G, and B digital image signals A/D-converted so that the black level becomes a reference black level.

In an embodiment, the white balance control module converts the level of each of the digital signals of R, G, and B color components on the basis of reference white in accordance with the type of light source. That is, the white balance control module performs white balance (WB) correction. More specifically, the white balance control module identifies a portion that is estimated to be white in the object image using the brightness and saturation on the basis of the reference WB correction data. Subsequently, the white balance control module then computes the average of each of the R, G, and B color components, the G/R ratio, and the G/B ratio in that portion. The white balance control module performs level correction using these values for R and B correction gains.

The gamma correction module corrects the gradation characteristic of the image data subjected to WB adjustment. More specifically, the gamma correction module non-linearly converts the level of the image data for each of the color components and controls the offset using a pre-defined gamma correction table.

In some embodiments, the imager 104 and the processing module 114 are operatively coupled with a controller 118. In an embodiment, the controller 118 facilitates the processing module 114 to have identical and matched left and right performance. In another embodiment, the controller 118 controls various image capturing operations performed by the imager 104 and the processing module 114. In an embodiment, the controller 118 is any type of microcomputer that comprises a Central Processing Unit (CPU), various support circuits, and a memory. The controller 118 reads out application programs stored in a Read Only Memory (ROM) and executes the program using the CPU. The CPU may comprise one or more commercially available microprocessors or microcontrollers that facilitate data processing and storage. Various support circuits facilitate operation of the CPU and may include clock circuits, buses, power supplies, input/output circuits and/or the like. The memory includes a ROM, Random Access Memory (RAM), disk drive storage, optical storage, removable storage, and the like.

The encoding module 116 encodes the processed vertically polarized image and the processed horizontally polarized image received from the processing module 114. In an embodiment, the encoding module 116 may include one or more High-Definition Serial Digital Interface (HDSDI) encoders for encoding the processed vertically polarized image and the processed horizontally polarized image received from the processing module 114. The encoder 116 generates a final output that is in a form of a left HD image and a right HD image which may be further broadcasted for decoding by media or transmission devices.

The imager 104 and the lens module 108 are operatively coupled with a lens control module 120. The lens control module 120 controls and then optimizes various stereoscopic effects by adjusting separation and convergence of the left lens 108A and the right lens 108B on receiving buffered feedback signals from the imager 104. In some embodiments, the stereoscopic effects may include adjustment for stereovision near and adjustment for stereovision far by optimizing the separation and convergence between the left lens 108A and the right lens 108B of the lens module 108. In an embodiment, the lens control module 120 is any type of microcomputer that comprises a Central Processing Unit (CPU), various support circuits and a memory. The CPU may comprise one or more commercially available microprocessors or microcontrollers that facilitate data processing and storage. Various support circuits facilitate operation of the CPU and may include clock circuits, buses, power supplies, input/output circuits and/or the like. The memory includes a ROM, RAM, disk drive storage, optical storage, removable storage, and the like for storing a control program or for storing data relating to status information.

Figure 2:
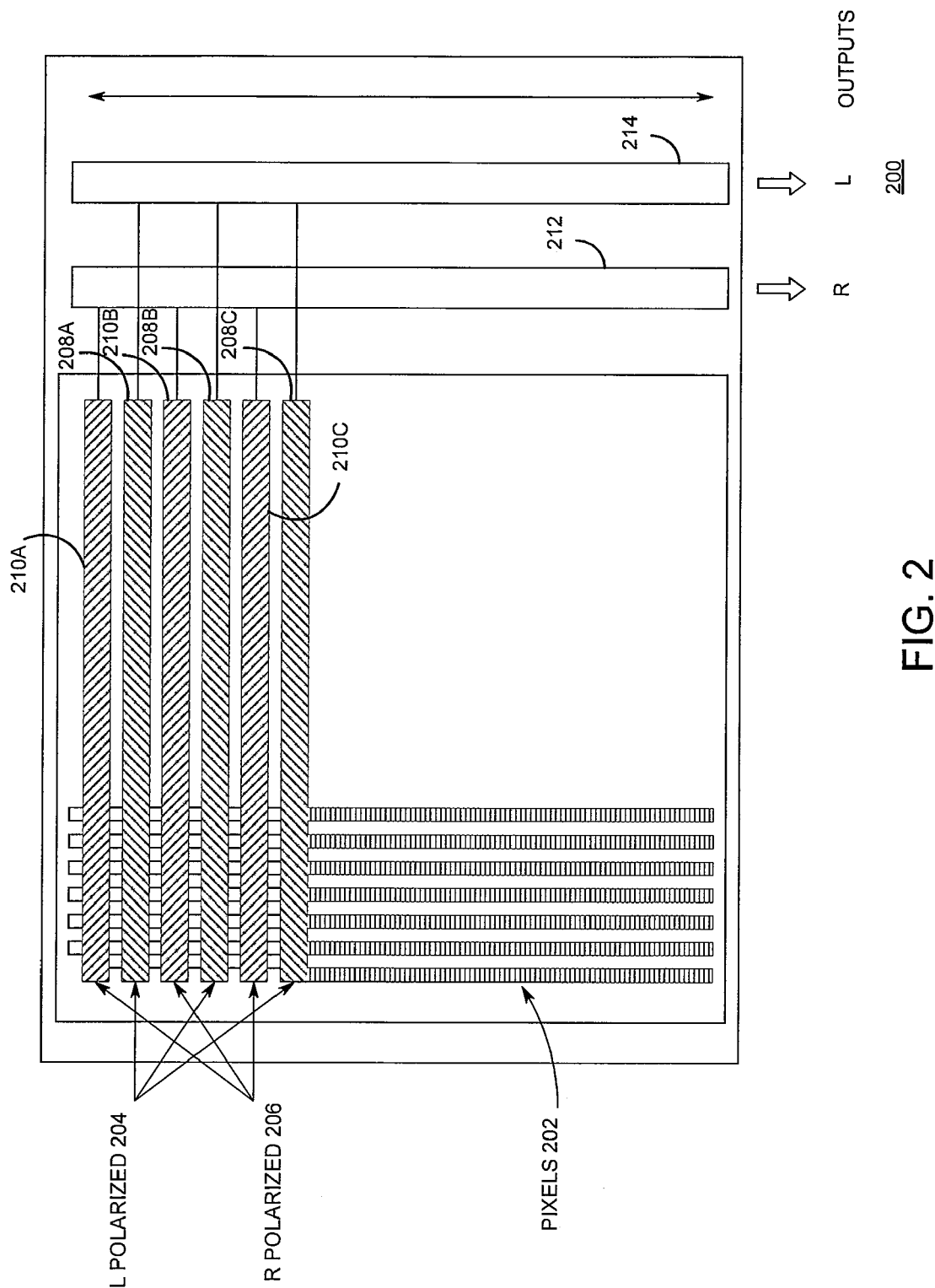
FIG. 2 illustrates a basic outline for an imager according to one or more embodiments of the present invention.

FIG. 2 illustrates a basic outline 200 for the imager 104 according to one or more embodiments of the present invention. The imager 104 includes an array of pixels 202. In an embodiment, the array of pixels 202 includes the one or more vertically polarized pixels and the one or more horizontally polarized pixels. The one or more vertically polarized pixels capture the vertically polarized image 204 (L Polarized) as shown by 208A, 208B, and 208C. The one or more horizontally polarized pixels capture the horizontally polarized image 206 (R polarized) as shown by 210A, 210B, and 210C. In an embodiment, the vertically polarized pixels and the horizontally polarized pixels are distributed in equal half for each frame. The imager 104 has two simultaneous CDS analog outputs, such as a Left output (L) 214 and a right output (R) 212 in accordance to an array of the vertically polarized pixels and the horizontally polarized pixels.

In an embodiment, the imager 104 is capable of separating colors and V and H polarized light into two independent RGB outputs, such as 212 and 214 for obtaining 3D or stereo images. In another embodiment, the imager 104 can produce three indecent RGB outputs. Thus, the separated vertically polarized image and the separated horizontally polarized image are generated using a single imager (i.e., the imager 104). Although the present embodiment relates to the use of a single imager, one of ordinary skill in the art would recognize that two or more imagers may be used to capture the image.

Figure 3:
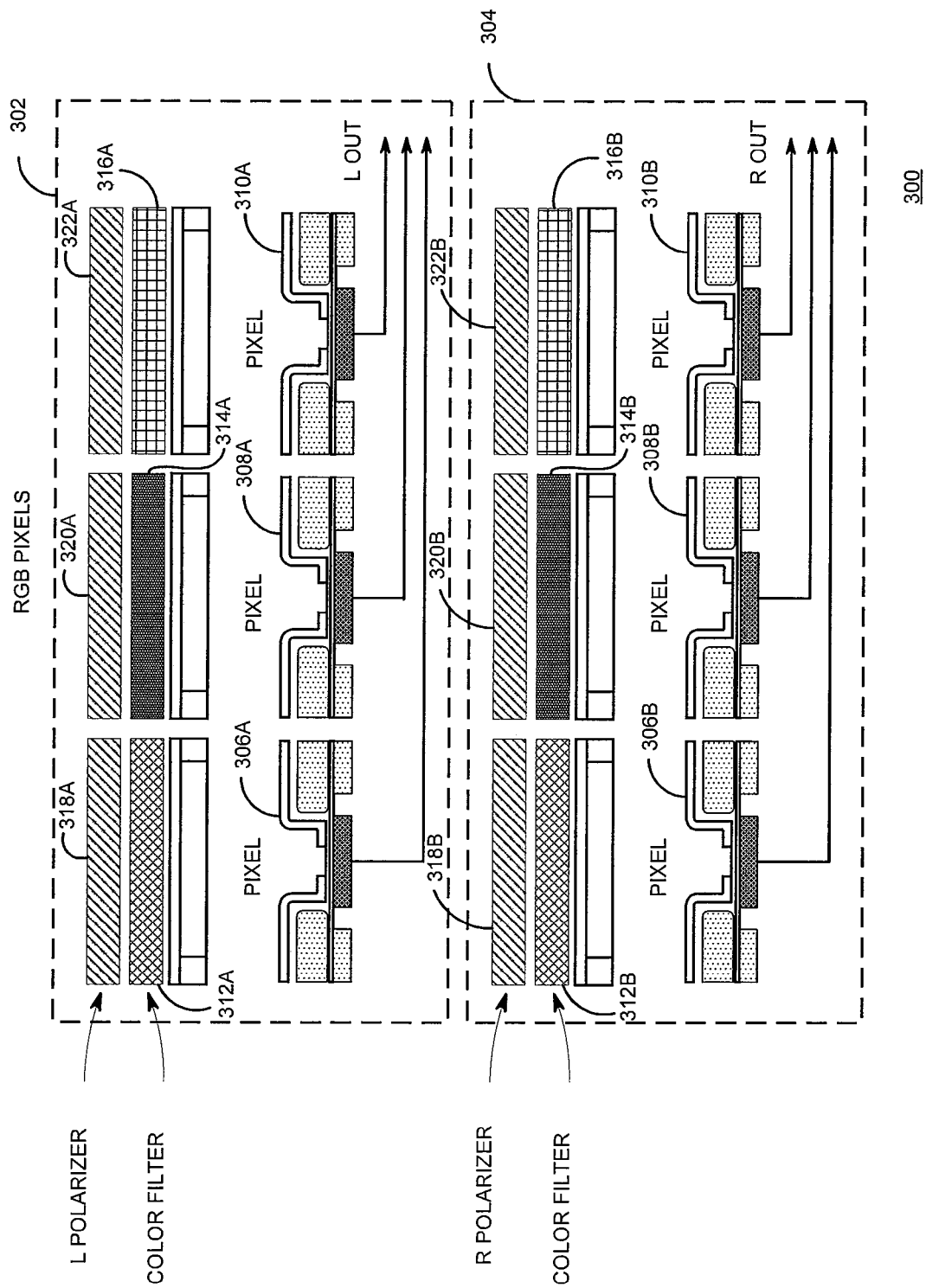
FIG. 3 illustrates a detailed construction of an imager according to one or more embodiments of the present invention.

FIG. 3 illustrates a detailed construction for the imager 104 according to one or more embodiments of the present invention. For illustration, architecture 300 for the imager 104 may be broadly described as a first portion 302 and a second portion 304. The first portion 302 represents various arrays of pixels, polarizer and color filter for generating separated vertically polarized image represented as L OUT. In an embodiment, the first portion 302 includes rows which have sequentially arranged RGB pixels, such as R pixel 306A, G pixel 308A, and B pixel 310A having respective color filters, such as R color filter 312A, G color filter 314A, or B color filter 316A on photodiodes. The first portion 302 further includes an L polarizer, such as 318A, 320A, and 322A corresponding to the R pixel 306A, the G pixel 308A, and the B pixel 310A respectively. In an embodiment, the pixels as illustrated herein are sequential RGB pixels which produce three indecent RGB outputs, such as L OUT (as shown by arrows).

In a similar manner, the complementary second portion 304 represents various arrays of pixels, polarizer and color filter for generating separated horizontally polarized image represented as R OUT. The second portion 304 includes rows which have sequentially arranged RGB pixels, such as R pixel 306B, G pixel 308B, and B pixel 310B having respective color filters, such as R color filter 312B, G color filter 314B, or B color filter 316B on photodiodes. The second portion 304 further includes an R polarizer, such as 318B, 320B, and 322B corresponding to the R pixel 306B, the G pixel 308B, and the B pixel 310B, respectively. In an embodiment, the pixels as illustrated herein are sequential RGB pixels which produce three independent RGB outputs, such as R OUT (as shown by arrows).

Figure 4:
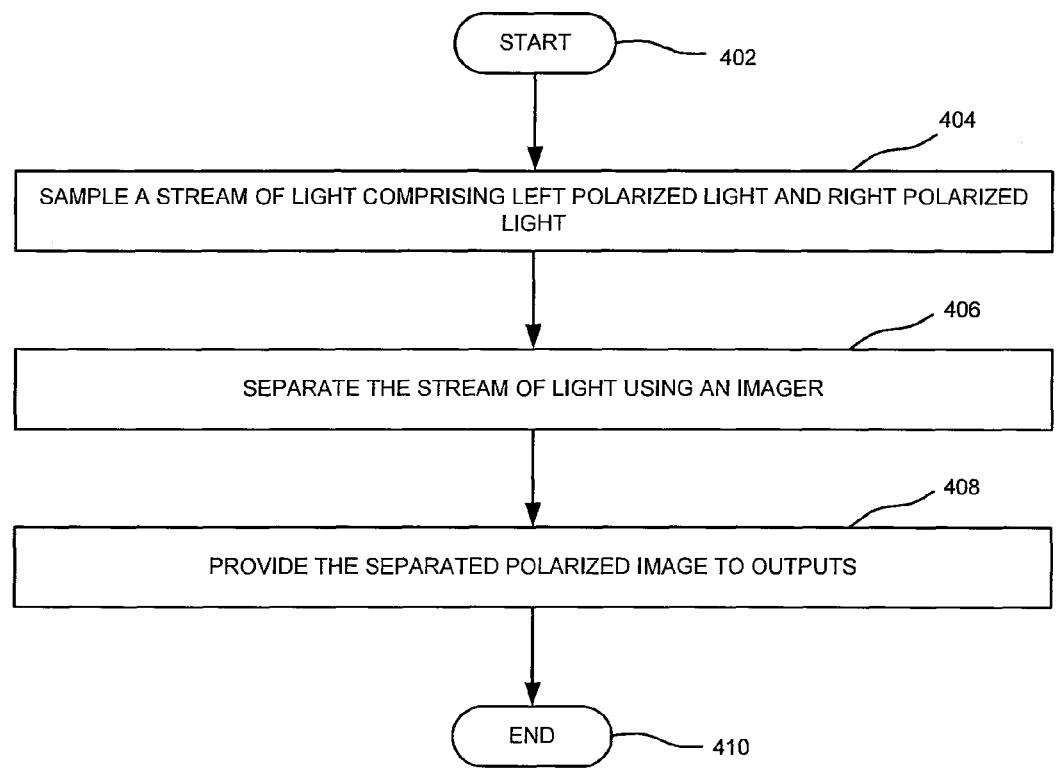
FIG. 4 illustrates a flow diagram of method for capturing a 3D image according to an embodiment of the present invention.

FIG. 4 illustrates a flow diagram of method for capturing a 3D image according to an embodiment of the present invention. The method 400 starts at step 402 and proceeds to step 404. At step 404, a combined beam of light comprising vertically polarized light and horizontally polarized light is sampled. At step 406, the combined beam of light is separated using an imager (i.e., the imager 104 of FIG. 1). In an embodiment, the beam of light is separated and captured into a vertically polarized image and a horizontally polarized image (i.e., the imager 104 of FIG. 1). In an embodiment, the imager 104 includes one or more vertically polarized pixels for capturing the vertically polarized image and one or more horizontally polarized pixels for capturing the horizontally polarized image. At step 408, the separated images are provided to outputs (i.e., a first output P1 and a second output P2 of FIG. 1). In an embodiment, the vertically polarized image and the horizontally polarized image are provided to a first output (i.e., an output P1 of FIG. 1) and to a second output (i.e. an output P2 of FIG. 1), respectively. The method 400 proceeds to step 410, at which the method 400 ends.

Figure 5:
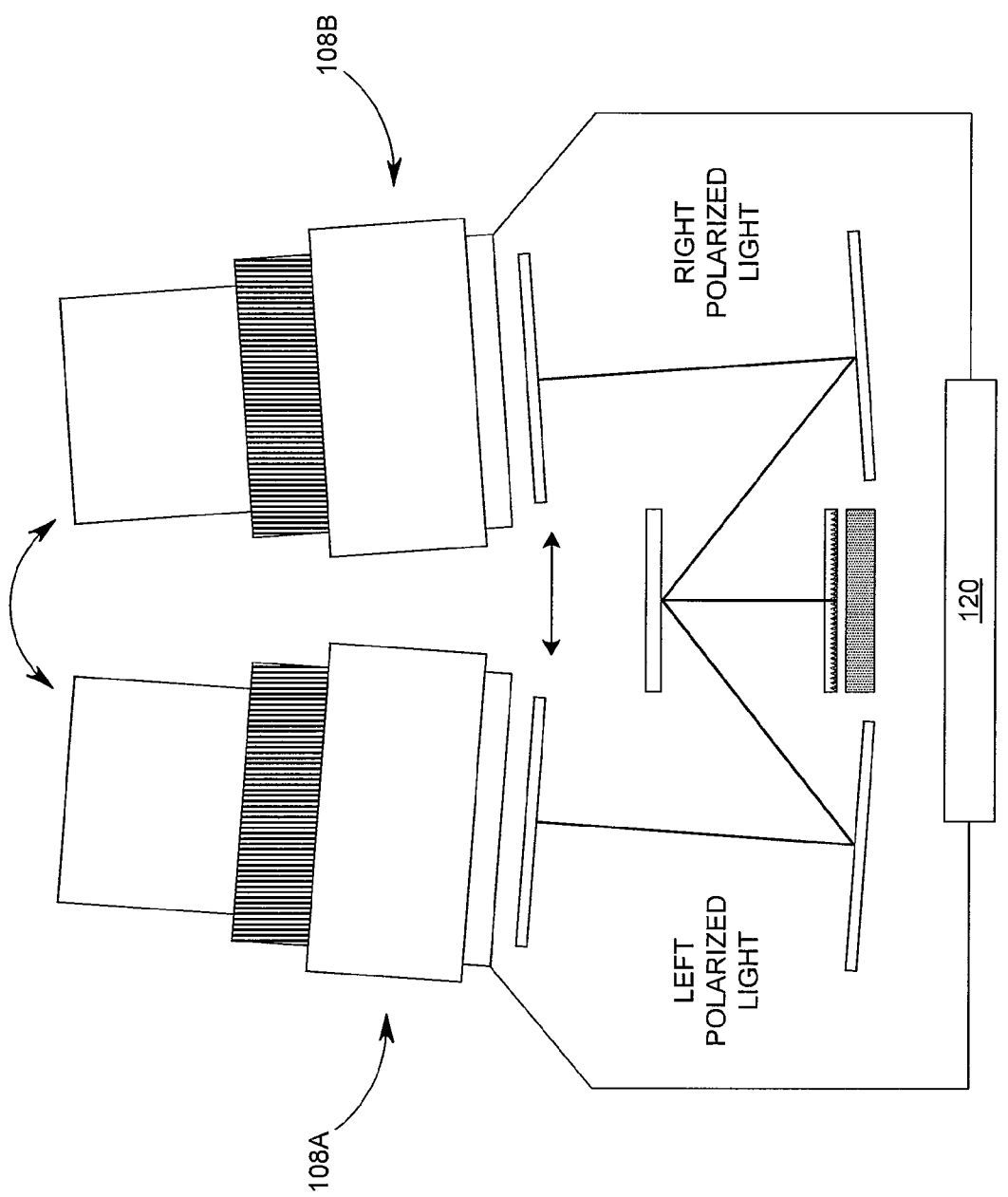
FIG. 5 illustrates a detailed operation of a 3D lens and lens controller according to an embodiment of the present invention.

FIG. 5 is an illustrative diagram of an embodiment of the lens module 108 operating in concert with the lens control module 120. In one embodiment, the lens module 108 is an apparatus as disclosed in U.S. patent application Ser. No. 12/487,443, which is herein incorporated by reference. By providing the ability to capture both the left and right image in a single camera, the lens control module 120 can simultaneously operate both the left and right elements of the lens module 108 to control for various image circumstances. For example, elements of the lens module 108 may need to converge to focus on a near object or diverge to focus on a far object. The lens control module 120 may provide multiple axes of movement for the lens module 108, as appropriate for focusing the image. This process allows embodiments of the present invention to advantageously adjust for different imaging conditions on the fly, without the need to synchronize the image capture settings with another camera device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for capturing a three-dimensional image comprising:
    capturing a first and second beam of light representing a first and second image, respectively;
    converting the first and second beam of light into a first and second polarized beam of light,
    wherein the first polarized beam and the second polarized beam are orthogonally polarized;
    combining the first and the second polarized beam of light into a combined beam of light;
    sampling the combined beam of light, the sampling including sampling the first polarized light, via a first set of polarized pixels, to produce a first polarized image, and sampling the second polarized light, via a second set of polarized pixels, to produce a second polarized image; and
    providing the first polarized image to a first output and the second polarized image to a second output.

2. The method of claim 1 comprising processing the first polarized image and the second polarized image.

3. The method of claim 2, wherein the step of processing further comprises at least one of applying a gamma correction, a white balance correction, and a color correction on the first polarized image and the second polarized image.

4. The method of claim 2, wherein the step of processing further comprises performing analog-to-digital conversion on the first polarized image and the second polarized image.

5. The method of claim 1 further comprising optimizing stereoscopic effects by adjusting separation and convergence of a lens module using a lens control module.

6. The method of claim 2 further comprising encoding the processed first polarized image and the processed second polarized image received from the processing module using an encoding module.

7. An apparatus for capturing a three-dimensional image comprising:
    a lens module for capturing a first beam of light representing a first image and second beam of light representing a second image;
    a filter module for converting the first and second beam of light into a first and second polarized beam of light, respectively;
    a polarization array for combining the first and second polarized beam of light into a combined beam of light; and
    one or more imagers for sampling the combined beam of light, wherein the imager is comprised of one or more first polarized pixels for sampling the first polarized beam of light into a first polarized image and one or more second polarized pixels for sampling the second polarized beam of light into a second polarized image, wherein the first polarized beam and the second polarized beam are orthogonally polarized, and providing the first polarized image to a first output and the second polarized image to a second output.

8. The apparatus of claim 7 further comprising a processing module for processing the first polarized image received from the first output and the second polarized image received from the second output.

9. The apparatus of claim 7, wherein the processing module performs analog-to-digital conversion for the first polarized image and the second polarized image.

10. The apparatus of claim 7, wherein the processing module further applies a gamma correction, a white balance correction, and a color correction on the first polarized image and the second polarized image.

11. The apparatus of claim 8 further comprising an encoding module for encoding the processed first polarized image and the processed second polarized image received from the processing module.

12. The apparatus of claim 7 further comprising a lens control module operatively coupled with the imager for optimizing stereoscopic effects by adjusting separation and convergence of a lens module.

* * * * *